(12) United States Patent
Mobin et al.

(10) Patent No.: US 7,787,515 B2
(45) Date of Patent: Aug. 31, 2010

(54) METHOD AND APPARATUS FOR GENERATION OF ASYNCHRONOUS CLOCK FOR SPREAD SPECTRUM TRANSMISSION

(75) Inventors: Mohammad S. Mobin, Orefield, PA (US); Gregory W. Sheets, Bangor, PA (US); Vladimir Sindalovsky, Perkasie, PA (US); William B. Wilson, Macungie, PA (US); Craig B. Ziemer, Fleetwood, PA (US)

(73) Assignee: Agere Systems Inc., Allentown, PA (US)

( * ) Notice: Subject to any disclaimer, the term of this patent is extended or adjusted under 35 U.S.C. 154(b) by 931 days.

(21) Appl. No.: 11/353,431

(22) Filed: Feb. 14, 2006

(65) Prior Publication Data
US 2007/0189360 A1    Aug. 16, 2007

(51) Int. Cl.
*H04B 1/00* (2006.01)

(52) U.S. Cl. ..................................... 375/130
(58) Field of Classification Search ................. 375/130
See application file for complete search history.

*Primary Examiner*—David C Payne
*Assistant Examiner*—Tanmay K Shah (57) ABSTRACT

A circuit for spread spectrum rate control uses a first interpolator to phase interpolate between a first signal and a second signal and generate a first output signal based on a first control signal. A second interpolator is utilized to phase interpolate between a third signal and a fourth signal and generate a second output signal based on a second control signal. A multiplexer is used to select, based on a select signal, the first output signal or the second output signal as a spread spectrum clock (SSCLK). A leap-frog interpolator control is used to generate, in synchronism with the SSCLK, the first control signal based on a first type of phase adjustment request, the second control signal based on a second type of phase adjustment request, and the select signal to switch the multiplexer between the first output signal and the second output signal after allowing for an interpolator settling time when changing the first control signal or the second control signal.

20 Claims, 5 Drawing Sheets

| PPM OFFSET | CLOCK PERIODS IN A SEQUENCE OF SIXTEEN 2UI CLOCKS | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | | | | | | | | | | | | | | | | |
| 488 | x | | | | | | | | | | | | | | | |
| 976 | x | | | | | | | | x | | | | | | | |
| 1465 | x | | | | | x | | | | | x | | | | | |
| 1953 | x | | | | x | | | | x | | | | x | | | |
| 2441 | x | | | x | | | x | | | x | | | x | | | |
| 2930 | x | | x | | | x | | x | | | x | | | x | | |
| 3417 | x | | x | | x | | x | | x | | x | | | x | | |
| 3906 | x | | x | | x | | x | | x | | x | | x | | x | |
| 4395 | | x | | x | | x | | x | | x | | x | x | | x | x |
| 4883 | | x | | x | x | | x | | x | x | | x | x | | x | x |
| 5371 | | x | x | | x | x | | x | x | | x | x | | x | x | x |
| 5859 | | x | x | x | | x | x | x | | x | x | x | | x | x | x |
| 6348 | | x | x | x | x | | x | x | x | x | | x | x | x | x | x |
| 6836 | | x | x | x | x | x | x | x | | x | x | x | x | x | x | x |
| 7324 | | x | x | x | x | x | x | x | x | x | x | x | x | x | x | x |
| 7812 | x | x | x | x | x | x | x | x | x | x | x | x | x | x | x | x |

METHOD AND APPARATUS FOR GENERATION OF ASYNCHRONOUS CLOCK FOR SPREAD SPECTRUM TRANSMISSION

FIELD OF INVENTION

The present invention relates generally to improved methods and apparatus for rate offset clock frequency generation, and more particularly, to advantageous techniques for rate offset clock frequency generation based on interpolation of multiphase clocks from a voltage controlled delay loop.

BACKGROUND OF INVENTION

The transfer of data between devices at high speeds may be affected by noise generated both external and internal to the data transfer system. The transfer and reception of data are affected by noise that causes jitter and skewing of clocks and data signals. High speed buses, such as a serial advanced technology attachment (SATA) bus, designed for data transfers between a processor system and a hard disk drive, may operate at three gigabits per second with increased data rates beyond that already planned. At these high data rates, the generation of electromagnetic interference may be significant and steps are typically taken to reduce the radiated affect of the high speed signals. These steps include shielding and the use of spread spectrum techniques, for example.

A high speed serial interface with fixed rate clocking will generate electromagnetic energy that may interfere with nearby equipment. With fixed rate clocking, the radiated energy will be concentrated at the frequency of the clock and also at harmonic frequencies of the clock. The radiated energy can be reduced by varying the frequency of the clock within a specified range, including the desired frequency. This approach of varying the clock frequency is referred to as spread spectrum clocking and is one of the techniques used for SATA data transfers.

A conventional analog technique for generating offset frequencies that are offset from a reference frequency uses a phase detector coupled to a charge pump and filter to control a voltage controlled oscillator (VCO). The VCO generates a signal at a frequency based on a difference in phase of the reference signal frequency compared to a feedback VCO output signal frequency. By providing a time varying current component to the charge pump and filter output, the frequency generated by the VCO will vary accordingly. However, providing the time varying current component according to spread spectrum requirements may be difficult and costly to implement.

Another technique for generating offset frequencies is described in U.S. Pat. No. 6,919,744 (Paist) assigned to the assignee of the present invention. The frequency spreading of the phase locked loop (PLL) output signal frequency is controlled by periodically changing divisor values used in a fractional divider that is placed in the feedback path of the PLL. The divisor values are generated according to a desired spread spectrum profile and the fractional divider divides the PLL output signal, generated from an internal VCO, by the divisor values. The output of the fractional divider is compared to a reference signal in a phase detector of the PLL such that the VCO output frequency follows the desired spread spectrum profile.

SUMMARY OF INVENTION

Among its several aspects, the present invention recognizes that there is a need for spread spectrum techniques that are low power and have low implementation costs. It is also recognized that prior techniques including interpolators in the PLL clock domain and their controls may cause discontinuities and non-linear changes in the output clock.

An embodiment of the present invention includes an apparatus for spread spectrum rate control. Included in the apparatus is a first interpolator which phase interpolates between a first signal and a second signal, and generates a first output signal based on a first control signal. A second interpolator is also included that phase interpolates between a third signal and a fourth signal, and generates a second output signal based on a second control signal. The apparatus also includes a multiplexer and a leap-frog interpolator control. The multiplexer is used to select, based on a select signal, the first output signal or the second output signal as a spread spectrum clock (SSCLK). The leap-frog interpolator control is used to generate, in synchronism with the SSCLK, the first control signal based on a first type of phase adjustment request, the second control signal based on a second type of phase adjustment request, and the select signal to switch the multiplexer between the first output signal and the second output signal after allowing for an interpolator settling time when changing the first control signal or the second control signal.

Another embodiment of the present invention addresses an apparatus for spread spectrum clock generation. Included in the apparatus is a voltage controlled phase locked loop generator that generates a voltage controlled output signal as a phase locked loop clock (PLLCK). Four phase delay elements, each of approximately equal delay, are included to delay the PLLCK from 0° to 360° with a delay tap at each 90° quadrant. A first multiplexer is used to select, based on a first select signal, one of two phase delay taps having 180° phase difference as a first signal. A second multiplexer is used to select, based on a second select signal, one of two phase delay taps having 180° phase difference and 90° phase shift from the two phase delay taps of the first multiplexer as a second signal. An interpolator is used for phase interpolating between the first signal and the second signal where the phase interpolation is based on a control signal and generating an interpolator output as a spread spectrum clock (SSCLK)

Another embodiment of the present invention addresses a method for spread spectrum rate control. A first signal and a second signal are phase interpolated in a first interpolator based on a first control signal. A third signal and a fourth signal are phase interpolated in a second interpolator based on a second control signal. The first output signal or the second output signal is selected as a spread spectrum clock (SSCLK) by a multiplexer based on a select signal. The first control signal is generated in a leap-frog interpolator control, in synchronism with the SSCLK, and based on a first type of phase adjustment request. The second control signal is generated in the leap-frog interpolator control, in synchronism with the SSCLK, and based on a second type of phase adjustment request. The select signal is also generated in the leap-frog interpolator control and in synchronism with the SSCLK to switch the multiplexer between the first output signal and the second output signal after allowing for an interpolator settling time whenever the first control signal or the second control signal have been changed.

A more complete understanding of the present invention, as well as other features and advantages of the invention, will be apparent from the following detailed description, the accompanying drawings, and the claims.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
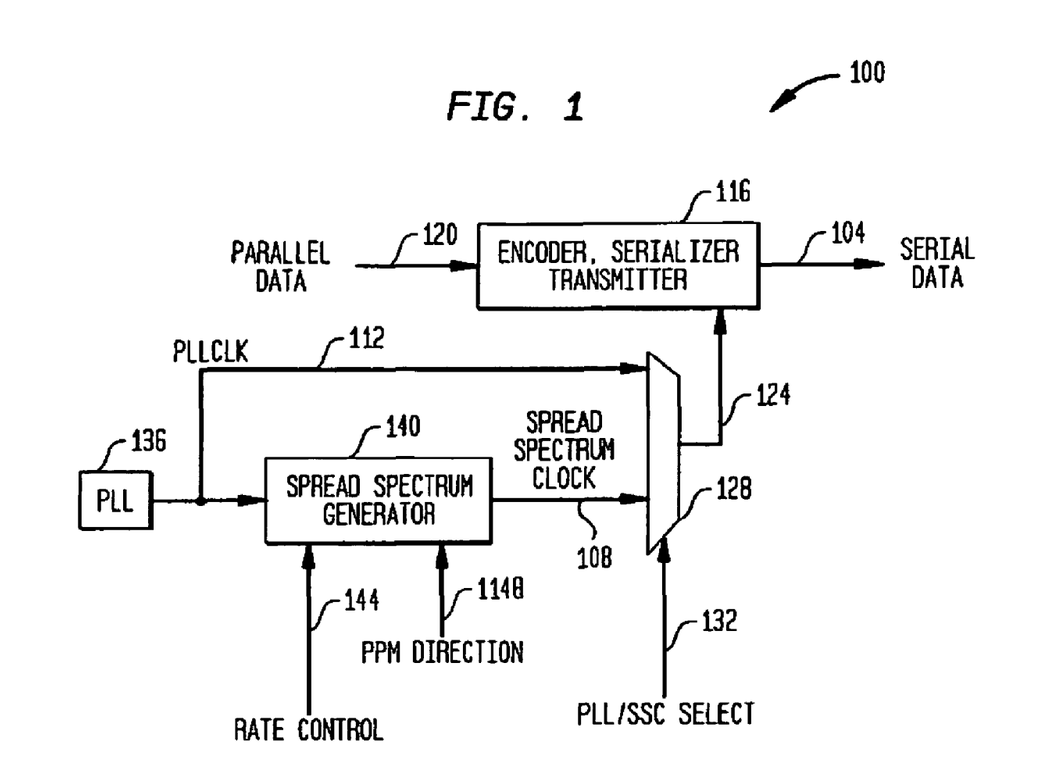
FIG. 1 illustrates an exemplary data transmission technique for transmitting serial data using a selectable spread spectrum clock or a selectable phase locked loop clock in accordance with the present invention.

FIG. 1 illustrates an exemplary data transmission technique 100 for transmitting serial data 104 using a selectable spread spectrum clock (SSCLK) 108 or a selectable phase locked loop (PLL) clock (PLLCLK) 112. An encoder, serializer, transmitter (EST) 116 receives parallel data 120 encodes and serializes the parallel data 120 for transmission as the serial data 104. To this end, EST 116 uses a clock 124 from a multiplexer 128. The multiplexer 128 receives a PLL/SSCLK select signal 132 to select the PPLCLK 112 when the spread spectrum feature is disabled, and to select the SSCLK 108 when the spread spectrum feature is enabled. The PLLCLK 112 is generated from a PLL 136. The spread spectrum generator 140 receives the PLLCLK 112, a rate control signal 144 defining the desired part per million (PPM) offset of SSCLK 108, and a direction of phase adjustment control (PPM direction) signal 148. By use of these signals, the spread spectrum generator 140 advantageously generates the SSCLK 108 using the techniques of the present invention as discussed further below.

The PPM offset may be defined as:

$$PPM = \frac{F - F_0}{F_0} * 1,000,000 \qquad \text{Equation 1}$$

where $F_0$ is a reference frequency and F is an output frequency. It is noted that when the PPM is not changing in time it is referred to as a constant PPM offset. A signal with a reference frequency of $F_0$ can be generally described as:

$$Y = \sin(2\pi F_0 t + \phi) \qquad \text{Equation 2}$$

In order to generate a spread spectrum clock based on equation 2, a PPM offset to the reference frequency $F_0$ is introduced by changing $\phi$ in accordance with the present invention and equation 3:

$$\phi(t) = 2\pi \Delta F t = 2\pi (F - F_0) t \qquad \text{Equation 3}$$

It is noted that the variable $\phi(t)$ may be implemented as a linear function of time allowing phase adjustments to be the same over equal periods of time. Substituting $\phi(t)$ from equation 3 for $\phi$ in equation 2 results in a new signal Y' at an adjusted output frequency F:

$$Y' = \sin(2\pi F t) \qquad \text{Equation 4}$$

Figure 2:
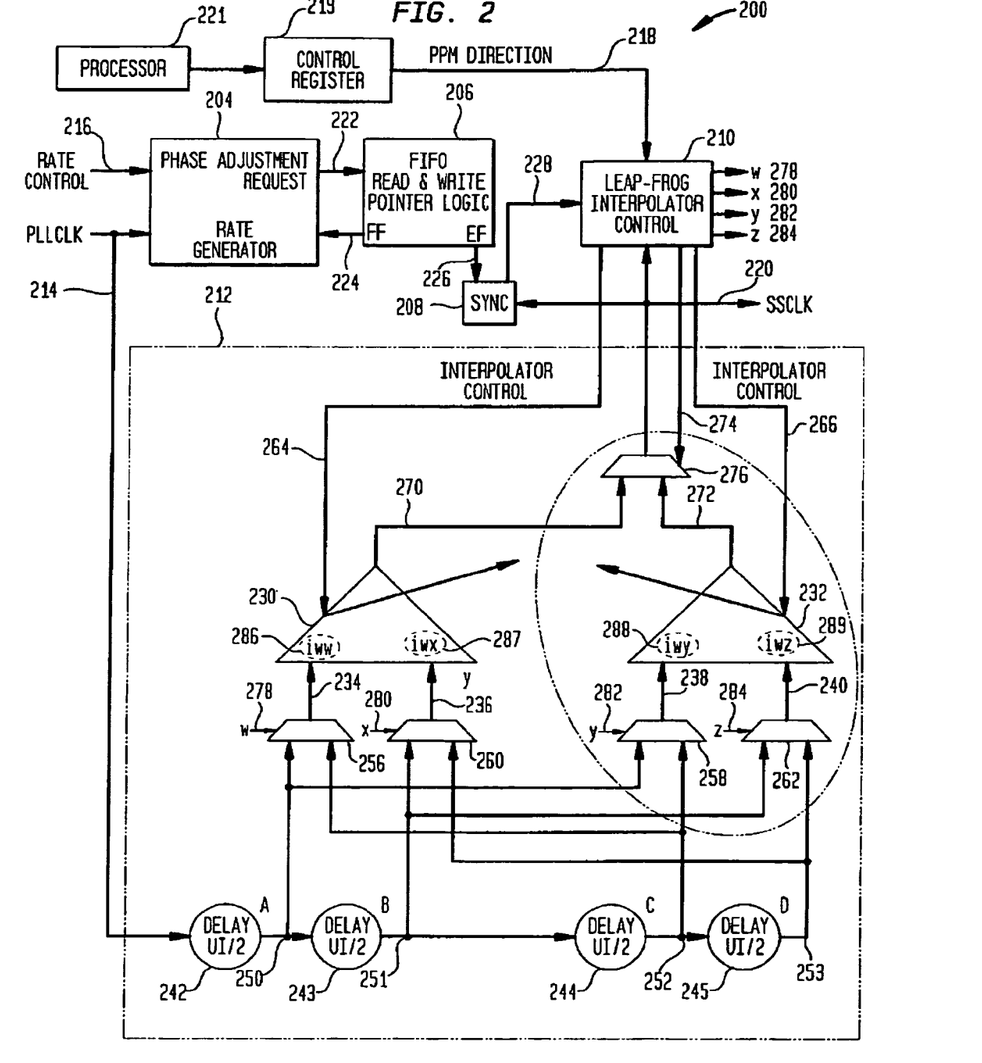
FIG. 2 illustrates an exemplary spread spectrum generator (SSG) in accordance with the present invention.

FIG. 2 illustrates an exemplary spread spectrum generator (SSG) 200 in accordance with the present invention. The SSG 200 is made up of a rate generator 204, first in first out (FIFO) read and write (R/W) pointer logic 206, synchronizer (SYNC) 208, a leap-frog interpolator control 210, and an bouncing interpolator unit 212. The SSG 200 may be suitably employed as the spread spectrum generator 140. It receives PLLCLK 214, rate control signal 216, and PPM direction signal 218 and generates SSCLK 220. The PPM direction signal 218 is provided from a control register 219 that is set by a software program running on a processor 221 associated with the spread spectrum generator 200. Based on existing standards, the PPM direction is typically set to indicate a negative direction. The rate control signal 216 may be generated by a state machine causing the SSG 200 to follow an exemplary piecewise PPM emulation graph 400 illustrated in FIG. 4, as described in more detail below. The rate generator 204 generates phase adjustment requests 222 based on the rate control signal 216 and an exemplary rate table 500 for phase adjustments in FIG. 5.

The rate control signal 216 may be constant in time causing a constant density of phase adjustment requests 222 in time. The direction of phase adjustments up or down is defined by PPM direction control 218. With a constant rate control signal 216, the bouncing interpolator unit 212 produces a constant PPM offset of the output frequency SSCLK 220 as compared to the PLL frequency of the PLLCLK 214. Alternatively, the rate control signal 216 may be changing in time emulating a triangle waveform of PPM offset as specified in the Serial Advanced Technology Attachment (ATA) specification revision 2.5 as provided by the Serial ATA International Organization incorporated by reference herein in its entirety.

The phase adjustment requests 222 are provided to the FIFO R/W pointer logic 206. The FIFO R/W pointer logic 206 implements read and write (R/W) pointer logic appropriate for FIFO operation. The FIFO R/W pointer logic 206 operates as if a FIFO having four entries was used for the purpose of generating full and empty signaling conditions. For example, on every write operation a write pointer (WPTR) is advanced and on every read operation a read pointer (RPTR) is advanced. The WPTR and the RPTR are compared to generate full and empty signaling flags based on an addressing range of four possible addresses.

A FIFO full (FF) signal 224 is used to stop the generation of the phase adjustment requests 222. This situation would indicate an abnormal behavior, and is not expected to happen in normal operation, since the PLLCLK 214 and the SSCLK 220 are very close in frequency. The FF signal 224, when indicating a full situation for a FIFO, if implemented, is used mainly for debugging purposes.

In a similar manner to the generation of the FF signal 224, an empty FIFO (EF) signal 226 is generated through a comparison of the FIFO RPTR and WPTR. When the EF signal 226 is zero, a not empty condition indicates that a phase adjustment request has been written into the FIFO read and write pointer logic 206.

The EF signal 226 is synchronized into the SSCLK domain in synchronizer (SYNC) 208 producing a synchronized EF signal 228. The synchronized EF signal 228 is used in a leap-frog interpolator control 210. The leap-frog interpolator control 210 advantageously operates in the SSCLK domain in order to reduce phase disturbances that may be caused by a change in the phase interpolation operation.

A transmit operation may be based on a transmission clock frequency equal to one half of the serial data transmission rate by using both edges of the transmission clock. If the duration of one serial bit in a transmission sequence is defined as one unit interval (UI), then the period of the transmission clock, such as a transmission clock based on the PLLCLK 112 of FIG. 1, will be 2 UI.

The bouncing interpolator unit 212 may be suitably comprised of four delay UI/2 elements 242-245, interpolators 230 and 232, and multiplexers 256, 258, 260, 262, and 276. The PLLCLK 214 is generated at a frequency whose period is 2 UI. The total delay of the four delay UI/2 elements 242-245 in the bouncing interpolator unit 212 is equal to the period of PLLCLK 214 in order to provide for a continuous interpolation range of 0 to 360 degrees. Since the PLLCLK 214 has a period of 2 UI, the output taps A 250, B 251, C 252, and D 253 from the delay UI/2 elements 242-245, respectively, represent multiphase signals with 90° offsets. An approach using phase detection of multiple taps 250-253 from the delay elements 242-245 may be used to control the delay elements 242-245, which may be implemented, for example, with standard techniques, such as, using current mode logic delay elements.

It is noted that an alternative approach uses a single interpolator, such as interpolator 230, for phase interpolation. In this alternative approach, the interpolator 232, multiplexers 258, 262, and 276, and the associated signals enclosed by the circled area 277 are not required. The interpolator 230 output 270 is used as the SSCLK 220.

A bouncing interpolator technique using two interpolators is used to eliminate first order discontinuities in the SSCLK phase when switching between quadrants of phase adjustment. According to this advantageous technique, the inputs of each interpolator 230 and 232 are switched when they are minimally weighted into the interpolator output. As a result, any first order discontinuity is virtually eliminated.

Taps 250-253 represent the beginnings and the ends of four quadrants in the interpolation range of 0 to 360 degrees of phase adjustment. The taps A 250 and C 252 are multiplexed in multiplexer 256 and multiplexer 258 to generate the phase offset interpolation clock 234 and the phase offset interpolation clock 238, respectively. Taps B 251 and D 253 are multiplexed in multiplexer 260 and in multiplexer 262 to generate the phase offset interpolation clock 236 and the phase offset interpolation clock 240, respectively. Leap-frog interpolator control 210 generates the multiplexer selection signals W 278, X 280, Y 282, and Z 284. The multiplexer selection signals W 278, X 280, Y 282, and Z 284 change when the boundary of a quadrant is reached and further phase adjustment is required.

The leap-frog interpolator control 210 provides for a greater settling time for each interpolator 230 and 232 located in the bouncing interpolator unit 212. The interpolator 230 receives a phase offset interpolation clock 234 and a phase offset interpolation clock 236. The interpolator 232 receives a phase offset interpolation clock 238 and a phase offset interpolation clock 240. In "leap-frog" fashion, one interpolator is advantageously being prepared for use while the other interpolator is in use.

The phase offset interpolation clocks 234, 236, 238, and 240 are interpolated in the corresponding interpolators 230 and 232 according to interpolator control signals 264 and 266, respectively. The interpolator 230 produces interpolated output 270, and the interpolator 232 produces interpolated output 272. These interpolators are used in leap-frog fashion, so that when a phase adjustment is needed, the interpolator which is not currently in use is adjusted by changing its control signal and/or multiplexing different signals to its left and right inputs. At a later point in time, a select signal 274 changes state causing the multiplexer 276 to select the interpolator output that has been prepared in advance. Since the interpolator control signals 264 and 266 and the select signal 274 are synchronized to the SSCLK 220, any changes to these signals occur at a corresponding SSCLK 220 clock transition reducing or virtually eliminating excessive disturbances to the SSCLK 220 phase that is being adjusted.

Figure 3:
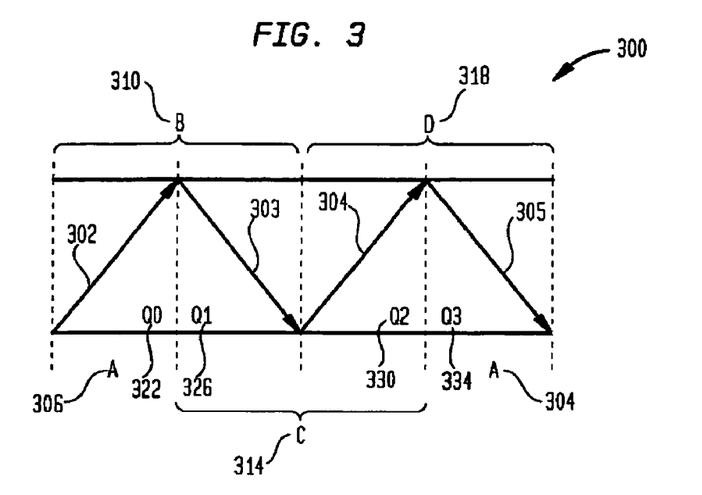
FIG. 3 illustrates an exemplary phase change graph in a bouncing interpolator unit for all four quadrants of phase adjustment in accordance with the present invention.

FIG. 3 illustrates an exemplary phase change graph 300 which may be suitably used in the bouncing interpolator unit 212 for all four quadrants of phase adjustment. In FIG. 3, tap labels A 306, B 310, C 314, and D 318 and quadrant labels Q0 322, Q1 326, Q2 330, and Q3 334 are superimposed to describe the operation of the bouncing interpolator technique. The tap label A 306 corresponds to tap A 250, tap label B 310 corresponds to tap B 251, tap label C 314 corresponds to tap C 252, and tap label D 318 corresponds to tap D 253. The quadrant labels Q0 322, Q1 326, Q2 330, and Q3 334, represent the quadrants' 90° phase shifts of the SSCLK 220. The phase offsets are changed by selectively applying the interpolator control signals 264 or 266 and the multiplexer selection signals 278, 280, 282, and 284, associated with the corresponding quadrants. With the SSCLK 220 phase in quadrant Q0 322, the phase offset interpolation clock 234 and phase offset interpolation clock 238 are connected to tap A through multiplexers 256 and 258, respectively. Also, in quadrant Q0 322, the phase offset interpolation clock 236 and phase offset interpolation clock 240 are connected to tap B through multiplexers 260 and 262, respectively.

The PPM direction signal 218 indicates the direction of frequency offsets of the SSCLK 220 with respect to the PLLCLK 214. For example, when the PPM direction signal 218 indicates a negative direction, up phase adjustment requests 222 are generated at an appropriate rate. In order to maintain a frequency offset, a constant rate of phase adjustment requests is generated. For example, up phase adjustment requests for a negative direction PPM offset or down phase adjustment requests for a positive direction PPM offset are applied by appropriately controlling the interpolators 230 and 232 and multiplexers 256, 258, 260, 262, and 276.

The interpolators 230 and 232 operate to interpolate between the two input phase offset clocks connected to the interpolators. Each interpolated output of the interpolators 230 and 232 is somewhere between the phases of the two input phase offset clocks associated with each interpolator. The interpolated output depends on internal weights, iww 286, iwx 287, iwy 288, and iwz 289, which are assigned a weighting value to each of the input phase offset clocks by the interpolator control signals 264 and 266. The interpolator 230 receives the two input phase offset interpolation clocks 234 and 236 which are phase offset from each other depending upon the tap selected from multiplexers 256 and 260, respectively. For example, if the interpolator control 264 is set to a zero, then iww 286 is at a maximum value A=100%, iwx 287 is at a minimum value (100−A)=0%, and the interpolated output 270 is approximately the same as the phase offset interpolation clock 234. If the interpolator control 264 is set to a maximum value, then iww 286 is at a minimum value, iwx 287 is at a maximum value, and the interpolated output 270 is approximately the same as the phase offset interpolated clock 236. If the interpolator control 264 is set to a middle value, then iww 286 is at a midrange value, iwx 287 is also at a midrange value, and the interpolated output 270 is interpolated to the middle between phases of the phase offset interpolation clock 234 and 236.

The interpolation weights iwx 287 and iwz 289 associated with the phase offset interpolation clocks 236 and 240, respectively, are increased for negative PPM direction according to the phase adjustment requests. At the same time, the interpolation weights iww 286 and iwy 288 of phase offset interpolation clocks 234 and 238, respectively, are decreased until the boundary of quadrant Q0 322 is reached. While the interpolator in use is operating, the interpolator not currently in use is prepared for a new interpolation output. At a later point in time, the multiplexer 276 select signal 274 is changed to select the interpolator with a desired phase as the SSCLK 220. This arrangement makes use of both interpolators in turn in each quadrant, hence the name "leap-frog".

At the boundary point, the phase offset interpolation clocks 236 and 240 are weighted maximally and the phase offset interpolation clocks 234 and 238 are weighted minimally with close to zero weights. In order to cross into quadrant Q1 326, the selection signal W 278 of multiplexer 256 for the phase offset interpolation clock 234 and the selection signal Y 282 of multiplexer 258 are changed to select tap C 252.

In preparation for the boundary crossing, while interpolator 230 is in use and the read and write pointer logic 206 indicates a non empty status, the interpolator 232 is prepared for the quadrant crossing. First, the interpolator control signal 266 for interpolator 232 is changed according to the desired phase change. If a phase up adjustment is to be made, then the interpolator control signal 266 will be increased, if interpolation occurs in quadrants 0 or 2. For the phase up adjustment in quadrants 1 or 3, the interpolator control signal 266 is decreased. If a quadrant boundary has to be crossed for the required phase adjustment, then a corresponding change is made to multiplexer selection signals Y 282 or Z 284. After a settling time utilized to allow the interpolated output 272 of the interpolator 232 to settle, the multiplexer select signal 274 is changed to connect the interpolated output 272 to SSCLK 220, and to disconnect interpolated output 270. At this point, the interpolator 230 is not directly affecting the SSCLK 220 and may be prepared for a further phase adjustment. With a further adjustment, the interpolator control 264 and multiplexer selection signals W 278 or X 280 are changed in the same fashion described above for interpolator 230. After a settling time, the multiplexer select signal 274 is changed connecting interpolator 230 to SSCLK 220 and disconnecting interpolator 232, and so on. For example, for a reference frequency of 2.5 Gigahertz, a settling time of 200 picoseconds (half a period) may suitably be used.

Any desired PPM offset curve, for example, the Serial ATA specification spread spectrum transmitter clock triangular frequency modulation profile may be built up of piecewise emulated segments by using negative PPM offset steps. In general, positive or negative PPM offset steps as illustrated in the exemplary piecewise PPM emulation graph 400 of FIG. 4 may be used. The vertical axis 404 of the PPM offset graph 400 is PPM offset and the horizontal axis 408 is time in reference clock periods.

The spread spectrum generator (SSG) 200, may operate with each step of a constant PPM offset which may be generated using a constant density of phase up adjustments, for a negative PPM direction. For example, a minimum phase adjustment may be defined as one adjustment out of sixteen 2 UI clock periods. This rate corresponds to one adjustment out of thirty two UI periods. Thus the phase adjustment cycle is defined in this example as one out of thirty two UI periods.

The steps of interpolation may be defined as thirty two steps over a UI/2 clock period. The step size is then UI/64, such that 32*UI/64=UI/2. With one adjustment out of thirty two UI periods, there is a corresponding PPM offset as given in equation 5:

$$\frac{UI}{64 \text{ steps}} * \frac{1 \text{ adjustment}}{32 UI} = \frac{1 \text{ adjustment}}{2048 \text{ steps}} \qquad \text{Equation 5}$$
$$= 488 \ PPM \text{ frequency offset}$$

Figure 4:
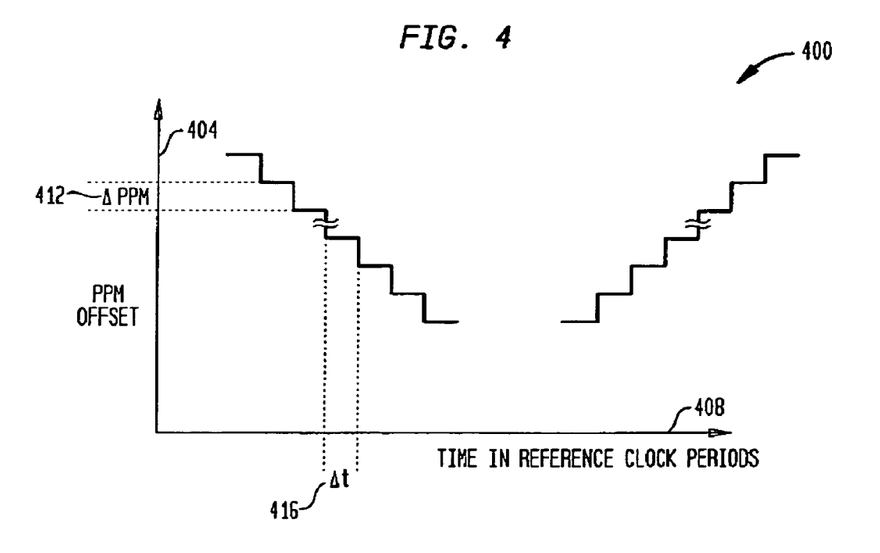
FIG. 4 illustrates an exemplary piecewise PPM emulation graph for use in conjunction with the present invention.

In FIG. 4, the ΔPPM 412 is 488 PPM and the Δt 416 is a duration of time with constant PPM offset. For example, if ten PPM steps are used for spread spectrum emulation first increasing negative PPM offset from zero to a maximum, and then decreasing back to zero in a 33 millisecond (msec) period, then 33 msec/20=1.65 msec=Δt 416. In another example, if sixteen steps span the whole interpolation range and each adjustment step occurs once every 32 UI clock periods, then it takes 16*32 UI=512 UI clock periods to span the whole interpolation range.

For example, the interpolators 230 and 232 have 5 bit interpolator controls 264 and 266 which are used to specify 32 steps of interpolation for every UI/2 interval. The number of phase adjustments can vary from one out of 16 2 UI clock periods to every 2 UI clock periods. Given these adjustment parameters, a rate table may be used to specify the clock periods in a sequence of sixteen 2 UI clocks where phase adjustments are to occur and the value of the PPM offset to be generated.

Figure 5:
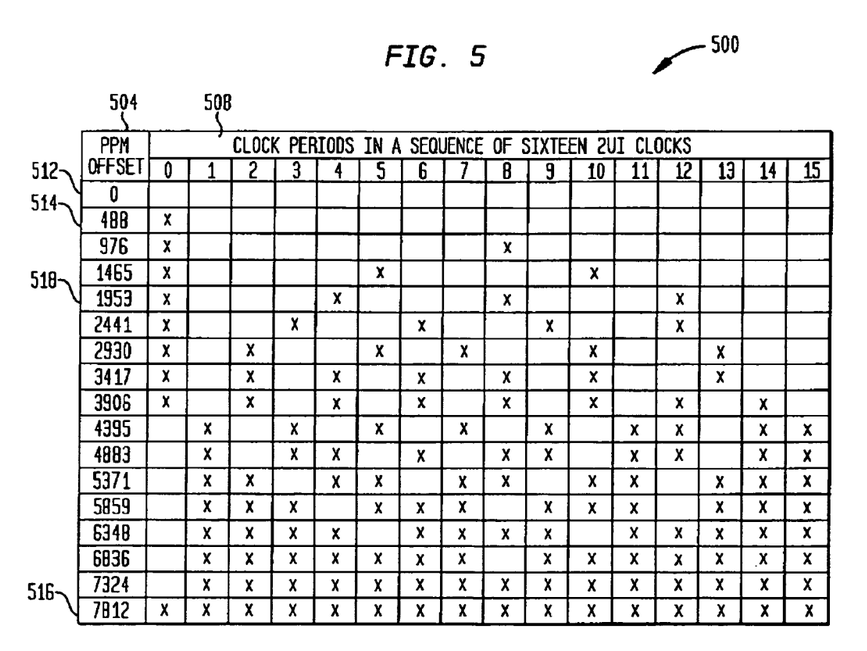
FIG. 5 illustrates an exemplary rate table for phase adjustments in accordance with the present invention.

FIG. 5 illustrates such an exemplary rate table 500 as an example for phase adjustments in accordance with the present invention. The rate table 500 is made up of a PPM offset column 504 and a "clock periods in a sequence of sixteen 2 UI clocks" column 508. The column 508 is split into 16 columns labeled for each clock period in the sequence of sixteen 2 UI clocks. The PPM offset column 504 has entries beginning at 0 512 for no PPM offset, a 488 PPM offset 514, and continuing linearly to a 7812 PPM offset 516. The clock periods where phase adjustment are to be made are illustrated in the rows by an "x" in a labeled clock period column. For example, in row 518, phase adjustments of 1953 PPM offset are to be made in clock periods {0, 4, 8, 12}.

Figure 6:
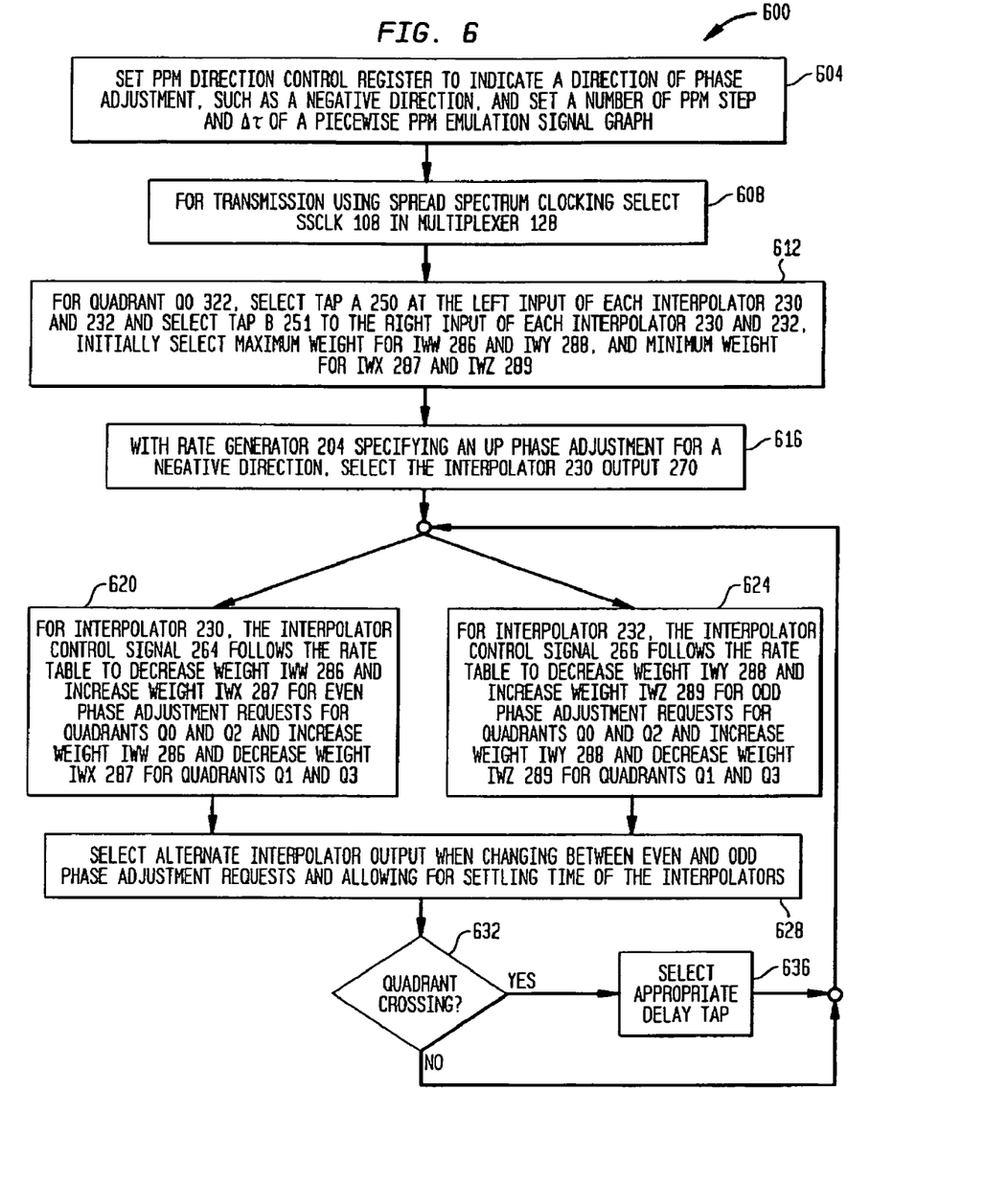
FIG. 6 illustrates a spread spectrum clock phase adjustment process in accordance with the present invention.

FIG. 6 illustrates a spread spectrum clock phase adjustment flow chart 600 in accordance with the present invention. An initialization step 604 sets the initial PPM direction control register 219 to indicate a direction of phase adjustment, such as a negative direction, for example. In initialization step 604, a number of PPM steps and Δt of a piecewise PPM emulation signal graph are set by either programming methods or fixed in hardware, depending upon a product's requirements. It is noted that the spread spectrum generator is designed to follow a rate table for phase adjustments, such as the rate table 500 of FIG. 5, which may also be fixed in hardware. In step 608, for transmissions using spread spectrum clocking, the SSCLK 108 is selected in multiplexer 128 of FIG. 1. In step 612, for quadrant Q0 322 of FIG. 3, and as illustrated in FIG. 2, tap A 250 is selected at the left input of each interpolator 230 and 232 and tap B 251 is selected at the right input of each interpolator 230 and 232. Initially, a maximum weight is selected for iww 286 and iwy 288 and a minimum weight is selected for iwx 287 and iwz 289. In step 616, with rate generator 204 specifying an up phase adjustment for a negative direction, the interpolator 230 output 270 is selected at multiplexer 276 by the leap-frog interpolator control 210.

At this point, the procedure splits into two parallel paths with steps 620 and 624 occurring in turns, hence leap-frog. The two interpolators 230 and 232 are operating with interpolator 230 in use and interpolator 232 preparing for use. In step 620 for interpolator 230, the interpolator control signal 264 is changed to follow the rate table, such as rate table 500 of FIG. 5, to decrease the weights iww 286 and increase the weight iwx 287 for even phase adjustment requests for quadrants Q0 322 and Q2 330. For quadrants Q1 326 and Q3 334, the interpolator control signal 264 is changed to follow the rate table to increase the weight iww 286 and decrease the weight iwx 287. In step 624 for interpolator 232, the interpolator control signal 266 is changed to follow the rate table, such as rate table 500 of FIG. 5, to decrease the weights iwy 288 and increase the weight iwz 289 for odd phase adjustment requests for quadrants Q0 322 and Q2 330. For quadrants Q1 326 and Q3 334, the interpolator control signal 266 is changed to follow the rate table to increase the weight iwy 288 and decrease the weight iwz 289.

In step 628, the multiplexer 276 is switched from the current interpolator output to the alternate interpolator output when changing between even and odd phase adjustment requests. By providing two interpolators, one in use and one being prepared for use, greater settling time for each of the two interpolators may be provided before either of the interpolators is selected into service. Also, since the interpolator control signals 264 and 266 are synchronized to the SSCLK domain, any changes to these control signals occur in synchronism with a change in the SSCLK thereby reducing or eliminating first order discontinuities in the SSCLK phase when switching between quadrants.

In step 632, it is determined whether a quadrant crossing is to occur. If no quadrant crossing is to occur, then the process proceeds to the parallel adjustment steps 620 and 624. If a quadrant crossing is to occur, then the process proceeds to step 636. In step 636, the appropriate delay tap is selected by leap-frog interpolator control 210 through use of select signals W 278, X 280, Y 282, or Z 284. The process then proceeds to the parallel adjustment steps 620 and 624.

While the present invention has been disclosed in a presently preferred context, it will be recognized that the present teachings may be adapted to a variety of contexts consistent with this disclosure and the claims that follow. For example, the present invention is disclosed mainly in the context of state machine control. It will appreciated that it may also be employed with a programmable mechanism which provides more flexibility in state transitions and state sequences. As another example, the rate change in time can be based on FIFO watermark flags. For example, when the FIFO tends to overflow, the transmit frequency will be forced higher and when the FIFO tends to deplete the transmit frequency will be forced lower. It will also be appreciated that variations in the particular hardware and software employed are feasible, and to be expected as both evolve with time. For example, it is possible that double or quadruple phase steps could be used. While this may increase phase noise, it also increases achievable PPM range. In this case, a FIFO would be written with data corresponding to the step size and a signal path would be provided to the leap-frog interpolator control to convey the step size information. The sequencing of the interpolators would still be in an even-odd-even-odd sequence but each phase step could be different. Other such modifications and adaptations to suit a particular design application will be apparent to those of ordinary skill in the art.

We claim:

1. An apparatus for spread spectrum rate control comprising:
   a first interpolator phase interpolating between a first signal and a second signal and generating a first output signal, where the phase interpolation is based on a first control signal;
   a second interpolator phase interpolating between a third signal and a fourth signal and generating a second output signal, where the phase interpolation is based on a second control signal;
   a multiplexer selecting, based on a select signal, the first output signal or the second output signal as a spread spectrum clock (SSCLK); and
   a leap-frog interpolator control generating, in synchronism with the SSCLK, the first control signal based on a first type of phase adjustment request, the second control signal based on a second type of phase adjustment request, and the select signal to switch the multiplexer between the first output signal and the second output signal after allowing for an interpolator settling time when changing the first control signal or the second control signal.

2. The apparatus of claim 1 further comprising:
   a voltage controlled phase locked loop clock generator that generates a voltage controlled output signal as a phase locked loop clock (PLLCLK); and
   four phase delay elements, each of substantially equal delay, to delay the PLLCLK from 0° to 360° with a delay tap at each 90° quadrant.

3. The apparatus of claim 2 further comprising:
   a first multiplexer selecting a first quadrant 0° tap or a third quadrant 180° tap as the first signal.

4. The apparatus of claim 2 further comprising:
   a second multiplexer selecting a second quadrant 90° tap or a fourth quadrant 270° tap as the second signal.

5. The apparatus of claim 2 further comprising:
   a third multiplexer selecting a first quadrant 0° tap or a third quadrant 180° tap as the third signal.

6. The apparatus of claim 2 further comprising:
   a fourth multiplexer selecting a second quadrant 90° tap or a fourth quadrant 270° tap as the fourth signal.

7. The apparatus of claim 1 wherein a first interpolator weighting is a function that takes A % of the first signal and (100-A) % of the second signal with A specified by the first control signal.

8. The apparatus of claim 1 wherein a second interpolator weighting is function that takes B % of the third signal and (100-B) % of the fourth signal with B specified by the second control signal.

9. The apparatus of claim 1 wherein the leap-frog interpolator control further comprises the use of an empty first in first out (EF) signal that initiates a phase adjustment on a non empty condition.

10. The apparatus of claim 1 wherein the first type of phase adjustment request is an even phase adjustment.

11. The apparatus of claim 1 wherein the second type of phase adjustment request is an odd phase adjustment.

12. An apparatus for spread spectrum clock generation comprising:
   a voltage controlled phase locked loop clock generator that generates a voltage controlled output signal as a phase locked loop clock (PLLCLK);
   four phase delay elements, each of approximately equal delay, to delay the PLLCLK from 0° to 360° with a delay tap at each 90° quadrant;

a first multiplexer selecting, based on a first select signal, one of two phase delay taps having 180° phase difference as a first signal;

a second multiplexer selecting, based on a second select signal, one of two phase delay taps having 180° phase difference and at a 90° phase shift from the two phase delay taps of the first multiplexer as a second signal; and an interpolator for phase interpolating between the first signal and the second signal where the phase interpolation is based on a control signal and generating an interpolator output as a spread spectrum clock (SSCLK).

13. The apparatus of claim 12 wherein the four phase delay elements comprise:

a zero to 90° phase delay element with a delay tap A;

a 90° to 180° phase delay element with a delay tap B;

a 180° to 270° phase delay element with a delay tap C; and a 270° to 360° phase delay element with a delay tap D.

14. The apparatus of claim 13 wherein the first multiplexer receives the delay taps A and C, the second multiplexer receives the delay taps B and D.

15. The apparatus of claim 12 further comprising:

a leap-frog interpolator control, operating in synchronism with the SSCLK, to individually generate the first select signal, the second select signal, and the control signal, the leap-frog interpolator control operation based on a direction of phase adjustment signal and an adjust phase signal.

16. The apparatus of claim 15 wherein the adjust phase signal selects clock periods to phase adjust to generate a uniform density of phase changes.

17. A method for spread spectrum rate control, the method comprising:

phase interpolating, in a first interpolator and based on a first control signal, a first signal and a second signal to produce a first output signal;

phase interpolating, in a second interpolator and based on a second control signal, a third signal and a fourth signal to produce a second output signal;

selecting, in a multiplexer and based on a select signal, the first output signal or the second output signal as a spread spectrum clock (SSCLK); and generating, in a leap-frog interpolator control and in synchronism with the SSCLK, the first control signal based on a first type of phase adjustment request, the second control signal based on a second type of phase adjustment request, and the select signal to switch the multiplexer between the first output signal and the second output signal after allowing for an interpolator settling time whenever the first control signal or the second control signal have been changed.

18. The method of claim 17 further comprises:

generating a voltage controlled phase locked loop clock (PLLCLK); and delaying the PLLCLK by 0° to 360° in four approximately equal 90° quadrant delay taps.

19. The method of claim 18 further comprises:

selecting in a first multiplexer a first quadrant 0° tap or a third quadrant 180° tap as the first signal;

selecting in a second multiplexer a second quadrant 90° tap or a fourth quadrant 270° tap as the second signal;

selecting in a third multiplexer a first quadrant 0° tap or a third quadrant 180° tap as the third signal; and selecting in a fourth multiplexer a second quadrant 90° tap or a fourth quadrant 270° tap as the fourth signal.

20. The method of claim 17 wherein the select signal switches the multiplexer to phase adjust the SSCLK with a uniform density of phase changes.

\* \* \* \* \*